(12) United States Patent
Hattabaugh et al.

(10) Patent No.: US 12,314,280 B2
(45) Date of Patent: May 27, 2025

(54) SYSTEMS AND METHODS FOR PROVIDING ANALYTICS REGARDING A PLURALITY OF OBJECT PROCESSING SYSTEMS

(71) Applicant: Berkshire Grey Operating Company, Inc., Bedford, MA (US)

(72) Inventors: Craig Hattabaugh, Wellesley, MA (US); Steve Johnson, Harpswell, ME (US); Jennifer Eileen King, Gibsonia, PA (US); John Richard Amend, Jr., Arlington, MA (US); Kyle Maroney, Saunderstown, MA (US); Thomas Wagner, Concord, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 249 days.

(21) Appl. No.: 17/513,091

(22) Filed: Oct. 28, 2021

(65) Prior Publication Data

US 2022/0138214 A1     May 5, 2022

Related U.S. Application Data

(60) Provisional application No. 63/107,324, filed on Oct. 29, 2020.

(51) Int. Cl.
*G06F 16/25* (2019.01)
*G06F 9/451* (2018.01)
*G06F 16/74* (2019.01)

(52) U.S. Cl.
CPC ............ *G06F 16/252* (2019.01); *G06F 9/451* (2018.02); *G06F 16/74* (2019.01)

(58) Field of Classification Search
CPC .................................................... G06F 16/252
See application file for complete search history.

(56) References Cited

U.S. PATENT DOCUMENTS

| 5,595,263 A | 1/1997 | Pignataro |
| 6,076,023 A | 6/2000 | Sato |

(Continued)

FOREIGN PATENT DOCUMENTS

| CN | 116583857 A | 8/2023 |
| EP | 2233400 B1 | 9/2010 |

(Continued)

OTHER PUBLICATIONS

Notification Concerning Transmittal of International Preliminary Report on Patentability and the International Preliminary Report on Patentability issued by the International Bureau of WIPO in related International Application No. PCT/US2021/056998 on May 11, 2023, 9 pages.

(Continued)

*Primary Examiner* — Baoquoc N To
(74) *Attorney, Agent, or Firm* — Gesmer Updegrove LLP

(57) ABSTRACT

An analytics system is disclosed for providing real time analytical data regarding operational characteristics of a plurality of object processing systems that process objects. The analytics system includes a communication system for accessing the warehouse management system and for obtaining object specific data, a data collection system for receiving real time data regarding processing at each of the plurality of object processing systems, each of the plurality of object processing systems including a programmable motion device that is programmed to process objects independent of other of the plurality of processing systems, an integration system for integrating the real time data with the object assignment data, and a graphic display system for displaying the real time data as associated with the assignment data.

32 Claims, 11 Drawing Sheets

(56) References Cited

U.S. PATENT DOCUMENTS

| | | | |
|---|---|---|---|
| 7,650,982 B2 | 1/2010 | Tachibana et al. | |
| 9,738,455 B2 | 8/2017 | Neiser et al. | |
| 10,265,872 B2 | 4/2019 | Wagner et al. | |
| 10,385,522 B1* | 8/2019 | Ellwein | E01C 19/405 |
| 10,407,844 B1* | 9/2019 | Nelson | E01C 19/48 |
| 10,853,757 B1 | 12/2020 | Hill et al. | |
| 2003/0029946 A1 | 2/2003 | Lieber et al. | |
| 2010/0241260 A1 | 9/2010 | Kilibarda et al. | |
| 2013/0345872 A1 | 12/2013 | Brooks et al. | |
| 2014/0195979 A1 | 7/2014 | Branton et al. | |
| 2016/0274586 A1 | 9/2016 | Stubbs et al. | |
| 2020/0094288 A1 | 3/2020 | Coupar et al. | |
| 2020/0401125 A1* | 12/2020 | Hirsch | G05B 23/0283 |
| 2021/0163235 A1* | 6/2021 | Mezzaro | B65G 47/52 |
| 2021/0173603 A1 | 6/2021 | Collet et al. | |
| 2021/0292100 A1* | 9/2021 | Schroader | B65G 43/08 |

FOREIGN PATENT DOCUMENTS

| | | | |
|---|---|---|---|
| WO | 2019090264 A1 | 5/2019 | |
| WO | 2022094040 A1 | 5/2022 | |

OTHER PUBLICATIONS

Communication pursuant to Rules 161(1) and 162 EPC issued by the European Patent Office in related European Patent Application No. 21811197.9 on Jun. 6, 2023, 3 pages.

International Search Report and Written Opinion issued by the European Patent Office, as the International Searching Authority, in related International Application No. PCT/US2021/056998 on Feb. 28, 2022, 13 pages.

\* cited by examiner

SYSTEMS AND METHODS FOR PROVIDING ANALYTICS REGARDING A PLURALITY OF OBJECT PROCESSING SYSTEMS

PRIORITY

The present application claims priority to U.S. Provisional Patent Application No. 63/107,324 filed Oct. 29, 2020, the disclosure of which is incorporated by reference in its entirety.

BACKGROUND

The invention generally relates to object processing systems, and relates in particular to object processing systems such as automated storage and retrieval systems, distribution center systems, and sortation systems that are used for processing a variety of objects.

Automated storage and retrieval systems (AS/RS), for example, generally include computer controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional object processing systems in terms of the time and resources required to move totes toward and then away from each person, as well as how quickly a person can process totes in this fashion in applications where each person may be required to process a large number of totes. There remains a need therefore, for an object processing system that stores and retrieves objects more efficiently and cost effectively, yet also assists in the processing of a wide variety of objects.

SUMMARY

In accordance with an aspect, the invention provides an analytics system for providing real time analytical data regarding operational characteristics of a plurality of object processing systems that process objects in accordance with a warehouse management system. The analytics system includes a communication system for accessing the warehouse management system and for obtaining object specific data, a data collection system for receiving real time data regarding processing at each of the plurality of object processing systems, each of the plurality of object processing systems including a programmable motion device that is programmed to process objects independent of other of the plurality of processing systems, an integration system for integrating the real time data with the object assignment data, and a graphic display system for displaying the real time data as associated with the assignment data.

In accordance with another aspect, the invention provides an analytics system for providing real time analytical data regarding operational characteristics of a plurality of object processing systems connected by at last one conveyor that process objects in accordance with a warehouse management system. The analytics system includes a data collection system for receiving real time data regarding processing at each of the plurality of object processing systems, each of the plurality of object processing systems including a programmable motion device that is programmed to process objects independent of other of the plurality of processing systems, an aggregation system for aggregating and storing aggregated data over a period of time regarding processing at each of the plurality of object processing systems, an integration system for integrating the real time data with the aggregated data, and a conveyor controller for adjusting a speed of the at least one conveyor responsive to the aggregated data.

In accordance with a further aspect, the invention provides an analytics system for providing real time analytical data regarding operational characteristics of a plurality of object processing systems that process objects in accordance with a warehouse management system using programmable motion devices. The analytics system includes a video data collection system for receiving video data regarding processing at each of the plurality of object processing systems, each of the plurality of object processing systems including a programmable motion device that is programmed to process objects independent of other of the plurality of processing systems, a video tagging system for associating portions of the video data with each of the plurality of objects being processed at each of the plurality of object processing systems, and providing object specific video data, an integration system for integrating the object specific video data with the warehouse management system, and a programmable motion device controller for controlling the operation of at least one of the programmable motion devices responsive to the aggregated data.

In accordance with a further aspect, the invention provides a method of providing real time analytical data regarding operational characteristics of a plurality of object processing systems connected by at least one conveyor that process objects in accordance with a warehouse management system. The method includes accessing the warehouse management system and for obtaining object specific data, receiving real time data regarding processing at each of the plurality of object processing systems, each of the plurality of object processing systems including a programmable motion device that is programmed to process objects independent of other of the plurality of processing systems, integrating the real time data with the object assignment data, and controlling a speed of the at least one conveyor responsive to the assignment data.

BRIEF DESCRIPTION OF THE DRAWINGS

The following description may be further understood with reference to the accompanying drawings in which.

The drawings are shown for illustrative purposes only.

DETAILED DESCRIPTION

In accordance with various aspects, the invention provides an analytics system for providing real time analytical data regarding operational characteristics of a plurality of object processing systems that process objects in accordance with a warehouse management system. The analytics system includes a communication system for accessing the warehouse management system and for obtaining object specific data; a data collection system for receiving real time data regarding processing at each of the plurality of object processing systems, each of the plurality of object processing systems including a programmable motion device that is programmed to process objects independent of other of the plurality of processing systems; an integration system for integrating the real time data with the object assignment data; and a graphic display system for displaying the real time data as associated with the assignment data.

In accordance with another aspect, the invention provides an analytics system that includes an aggregation system for aggregating and storing aggregated data over a period of time regarding processing at each of the plurality of object processing systems; an integration system for integrating the real time data with the aggregated data; and a graphic display system for displaying the real time data together with the aggregated data. In accordance with a further aspect, the analytics system includes a video data collection system for receiving video data regarding processing at each of the plurality of object processing systems, each of the plurality of object processing systems including a programmable motion device that is programmed to process objects independent of other of the plurality of processing systems, and the system further includes a video tagging system for associating portions of the video data with each of the plurality of objects being processed at each of the plurality of object processing systems, and providing object specific video data; an integration system for integrating the object specific video data with the warehouse management system; and a graphic display system for displaying the real time data together with the aggregated data.

Figure 1:
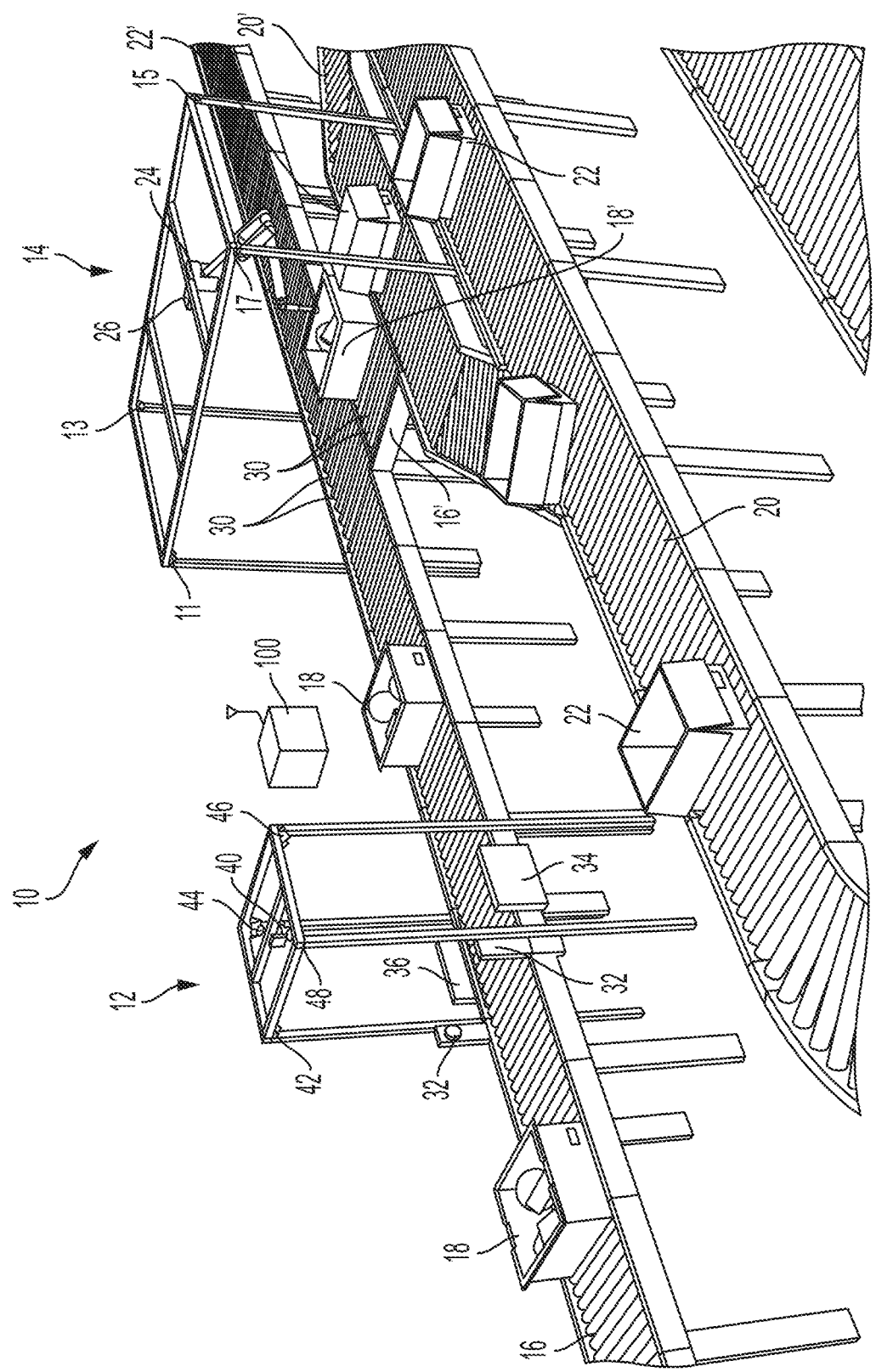
FIG. 1 shows an illustrative diagrammatic view of an object processing system for use an analytics system in accordance with an aspect of the present invention.

FIG. 1 shows an object processing system 10 that includes an object processing station 14 and a site intake perception system 12. An infeed conveyor 16 carries infeed bins 18, and a destination conveyor 20 carries destination containers 22. The object processing station 14 includes a programmable motion device (e.g., an articulated arm 24) with an attached end-effector as well as an associated perception system 26. The perception system 26 is positioned to perceive objects (and/or associated indicia) in selected infeed bins 18' that are diverted (selected) by bi-directional conveyors 30 to move onto a selected infeed conveyor section 16'. The perception system 26 is positioned as well to perceive destination containers 22' that are provided on a processing destination conveyor section 22' of the destination conveyor 22, via one or more diverters that selectively divert selected destination containers 22' onto the processing destination conveyor section 20'. Operation of the system is controlled by one or more computer processing systems 100 that communicate with the conveyors and the programmable motion devices disclosed herein (including the end-effector) as well as the perception systems.

The object processing station 14 includes an infeed conveyor section 16' that circulates selected supply bins 18' from and back to the infeed conveyor 16 using the diverter bi-directional conveyors 30. The end-effector of the programmable motion device 24 is programmed to grasp an object from the a supply bin 18', and move the object to deliver it to a desired destination bin 22' on the destination conveyor load area 20' by placing or dropping the object into a destination container 130' on the destination conveyor 128' at the destination conveyor load area. The supply bin 18' may then be returned to the input conveyor 16 and, optionally, brought to a further processing station. At the processing station 14 therefore, one or more vendor supply bins 18' are routed to an input area, and the programmable motion device 24 is actuated to grasp an object from a bin 18', and to place the object into a selected destination container 22'. The processed vendor bins 18' are then returned to the common input stream on the conveyor 16, and the destination container 22' is moved further along the destination conveyor 20.

The site intake perception system 12 of the system 10 includes one or more perception units 32 located on or near the infeed conveyor 16 for identifying indicia on an exterior of each of the bins 18, providing perception data from which the contents of the bin may be identified, and then knowing its relative position on the conveyor 16, track its location. It is assumed, in accordance with an aspect, that the bins of objects are marked in one or more places on their exterior with a visually distinctive mark such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes an identifying indicia (e.g., a symbol string), which is typically a string of letters and/or numbers. The symbol string uniquely associates the vendor bin with a specific set of homogenous objects. Based on the identified code on an infeed bin 18, the system may either permit a bin 18 to continue along the infeed conveyor 16, or may direct the selected bin 18' onto the selected infeed conveyor 16'.

At the object processing station 14, the perception system 26 assists (using the central control system 100—e.g., one or more computer processing systems) and the programmable motion device 24 including the end-effector, in locating and grasping an object in the infeed bin 18'. In accordance with further aspects, each object may also be marked with a visually distinctive mark, again such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Again, multiple symbologies or labeling approaches may be employed on each object.

The site intake perception system 12 further includes a top perception unit 40 as well as a plurality of perception units 42, 44, 46, 48 that are directed downward onto the one or more objects in each infeed bin 18 on the infeed conveyor 16, as well as a weight sensing section 34 of the conveyor 16 under the perception system 12. Further, the weight sensing section 34 may further include a vibratory device 36 for shaking the bin in order to cause objects within the bin to spread apart from one another within the bin as discussed in more detail below. The perception system is mounted above the conveyor into each bin of objects to be processed next looking down into each bin 18. The perception units, for example, may include, a camera, a depth sensor and lights. A combination of 2D and 3D (depth) data is acquired. The depth sensor may provide depth information that may be used together with the camera image data to determine depth information regarding the various objects in view. The lights may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 2A:
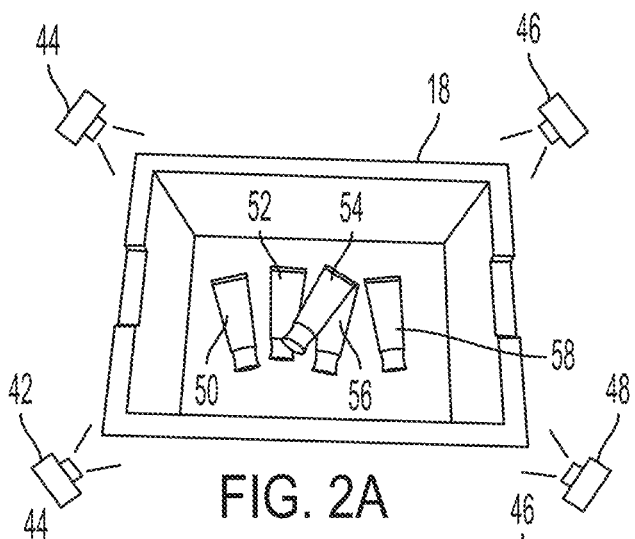
FIGS. 2A-2C show illustrative diagrammatic views of a view of a bin in accordance with an aspect of the present invention, showing a camera view (FIG. 2A), a volumetric scan of the bin (FIG. 2B), and a 3-D scan using edge detection (FIG. 2C)

FIG. 2A shows a view of a bin 18 from the perception system 12, which includes perception units 42, 44, 46 and 48. The image view of FIG. 2A shows the bin 18 (e.g., on the conveyor 16), and the bin 18 contains objects 50, 52, 54, 56, 58. While in certain systems, the objects in each infeed bin may be non-homogenous (multiple SKUs), in other systems, such as shown in FIG. 2A, the objects may be homogenous (single SKU). The system will identify candidate grasp locations on one or more objects, and may not try to yet identify a grasp location for the object that is partially obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available. The system may further include a plurality of cameras 11, 13, 15, 17 at the processing station 14 for monitoring the operation of the processing station. In particular, the cameras may be used with the computer processing system (e.g., including the one or more processors 100) to watch the programmable motion device 24 as it selects, grasps, moves and deposits each object.

Figure 2B:
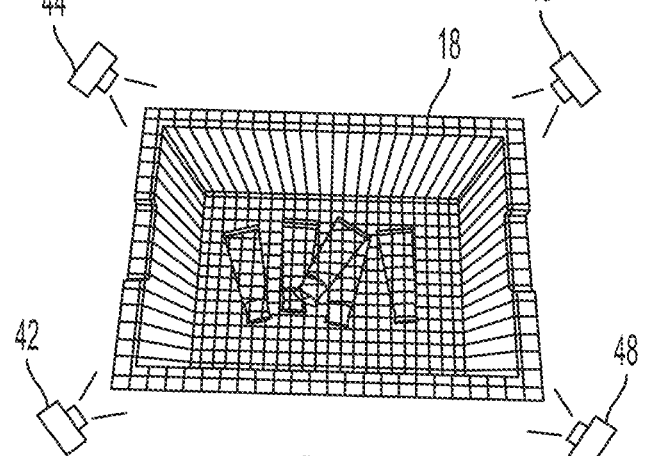

The perception system 12 additionally includes among the perception units 42-48, scanning and receiving units as well as edge detection units for capturing a variety of characteristics of a selected object of the whole bin. Again, FIG. 2A shows a view from the capture system, which in accordance with an embodiment, may include a set of similar or similar objects 50, 52, 54, 56, 58. The difference in volume, if any, as scanned is shown in FIG. 2B and compared with recorded data regarding the item that is identified by the identifying indicia as provided by the detection system of the SKU induction system or the recorded object data. In particular, the scanned volume is compared with a volume of the identified SKU multiplied by the number of objects known to be in the bin.

In accordance with further aspects, the scanning and receiving units may also be employed to determine a density of the collection of objects in the bin, which is compared with a known density of the identified SKU multiplied by the known number of objects in the bin from knowing the object's mass and volume. The volumetric data may be obtained for example, using any of light detection and ranging (LIDAR) scanners, pulsed time of flight cameras, continuous wave time of flight cameras, structured light cameras, or passive stereo cameras.

Figure 2C:
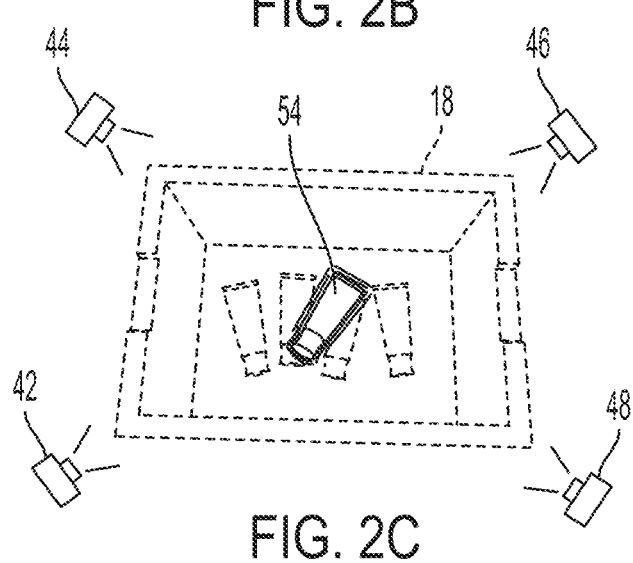

In accordance with further aspects, the system may additionally employ edge detection sensors that are employed (again together with the processing system 100), to detect edges of any objects in a bin, for example using data regarding any of intensity, shadow detection, or echo detection etc., and may be employed for example, to determine any of size, shape and/or contours as shown in FIG. 2C to aid in confirming a number of objects in the bin. In certain aspects, the system may identify a specific object in the bin and confirm its shape and size through such edge detection. The above system therefore, may be used to confirm a number of objects in a bin, and in certain aspects, to originally estimate a number of (single SKU) objects in a bin, and/or confirm the recorded data for any particular SKU.

The perception units 62, 64, 66, 68 may also be employed to monitor activity at the object processing station 14. Such perception units (and associated processing) permits the system to monitor a wide variety of activity at the processing station 14, as well as infeed supply and output bin flow. Again, the operations of the system described above are coordinated with a central control system 100 that again communicates (e.g., wirelessly) with the articulated arm 24, the perception systems 32, 42-48, 62-68, as well as in-feed conveyors 16, 16', bi-directional conveyors 30, destination conveyors 20, 20' and any diverters. This system determines from symbol strings the UPC associated with a vendor bin, as well as the outbound destination for each object. The central control system 100 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

In accordance with another aspect therefore, the invention provides an analytics system for providing real time analytical data regarding operational characteristics of a plurality of object processing systems that process objects in accordance with a warehouse management system. The analytics system includes a data collection system for receiving real time data regarding processing at each of the plurality of object processing systems, each of the plurality of object processing systems including a programmable motion device that is programmed to process objects independent of other of the plurality of processing systems; an aggregation system for aggregating and storing aggregated data over a period of time regarding processing at each of the plurality of object processing systems; an integration system for integrating the real time data with the aggregated data; and a graphic display system for displaying the real time data together with the aggregated data.

In accordance with a further aspects therefore, the invention provides an analytics system for providing real time analytical data regarding operational characteristics of a plurality of object processing systems that process objects in accordance with a warehouse management system. The analytics system includes a video data collection system for receiving video data regarding processing at each of the plurality of object processing systems, each of the plurality of object processing systems including a programmable motion device that is programmed to process objects independent of other of the plurality of processing systems; a video tagging system for associating portions of the video data with each of the plurality of objects being processed at each of the plurality of object processing systems, and providing object specific video data; an integration system for integrating the object specific video data with the warehouse management system; and a graphic display system for displaying the real time data together with the aggregated data.

Figure 3:
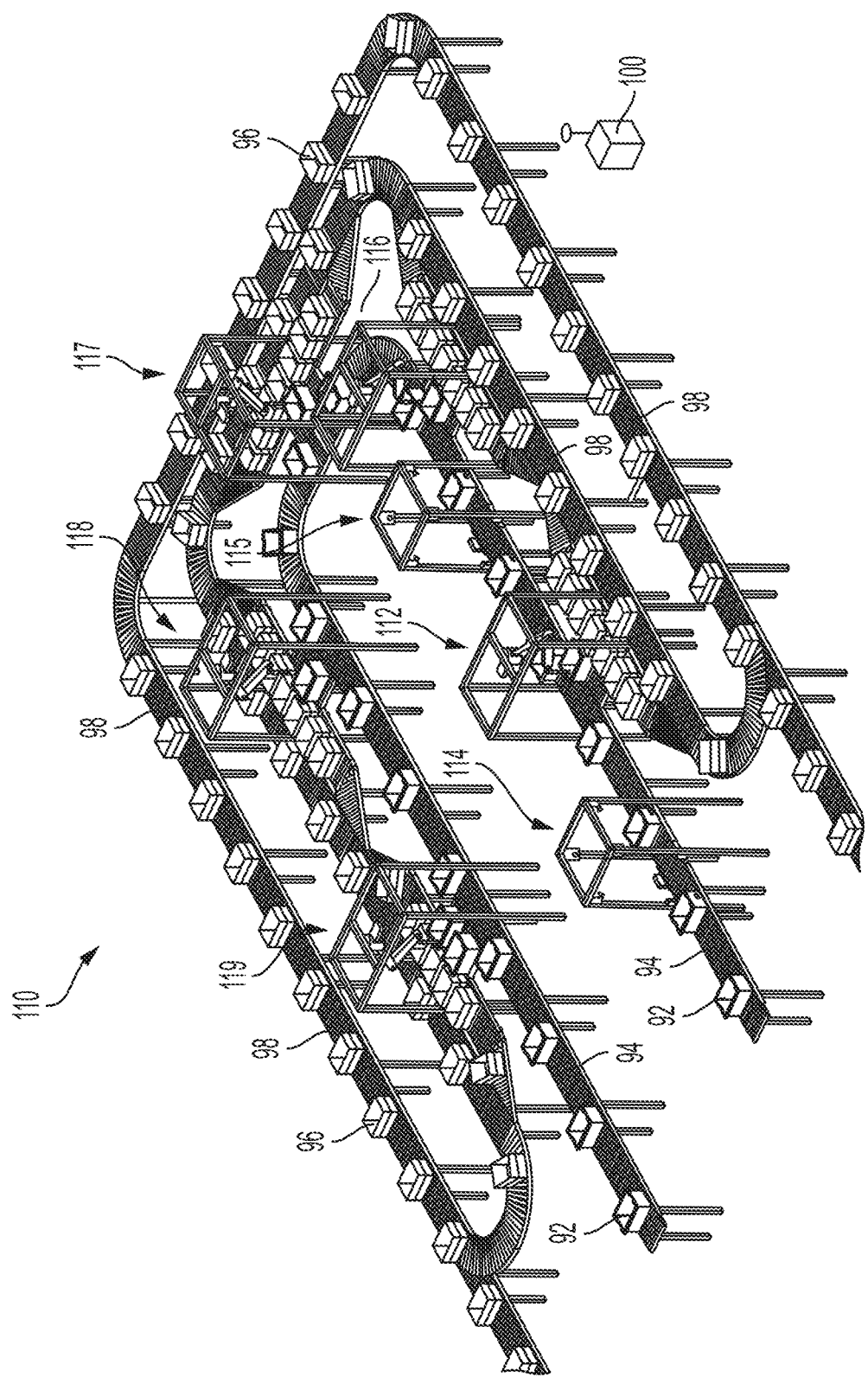
FIG. 3 shows an illustrative diagrammatic view of a plurality of object processing systems for use in an analytics system in accordance with an aspect of the present invention.

FIG. 3 shows at 110 a system that includes a plurality of object processing systems 112, 116, 117, 118, 119 as discussed above with reference to system 14 of FIG. 1, and any one or two or more (e.g., all) such processing systems may include an associated site intake perception system 114, 115 as also discussed above with reference to the site intake perception system 12 discussed above with reference to FIG. 1. Each site intake perception system 114, 115 may provide checks on the totes as they pass through each system 112, 116, not only visually and volumetrically checking the contents, but also providing information regarding the weight of the contents of the tote as well as redistributing an objects within the tote to facilitate later grasping by a robot. Each object processing system 112, 116, 117, 118, 119 is in communication with a common in-feed conveyor 94 on which infeed totes 92 are provided, as well as a common output conveyor 98 on which output containers 96 are provided.

Figure 4:
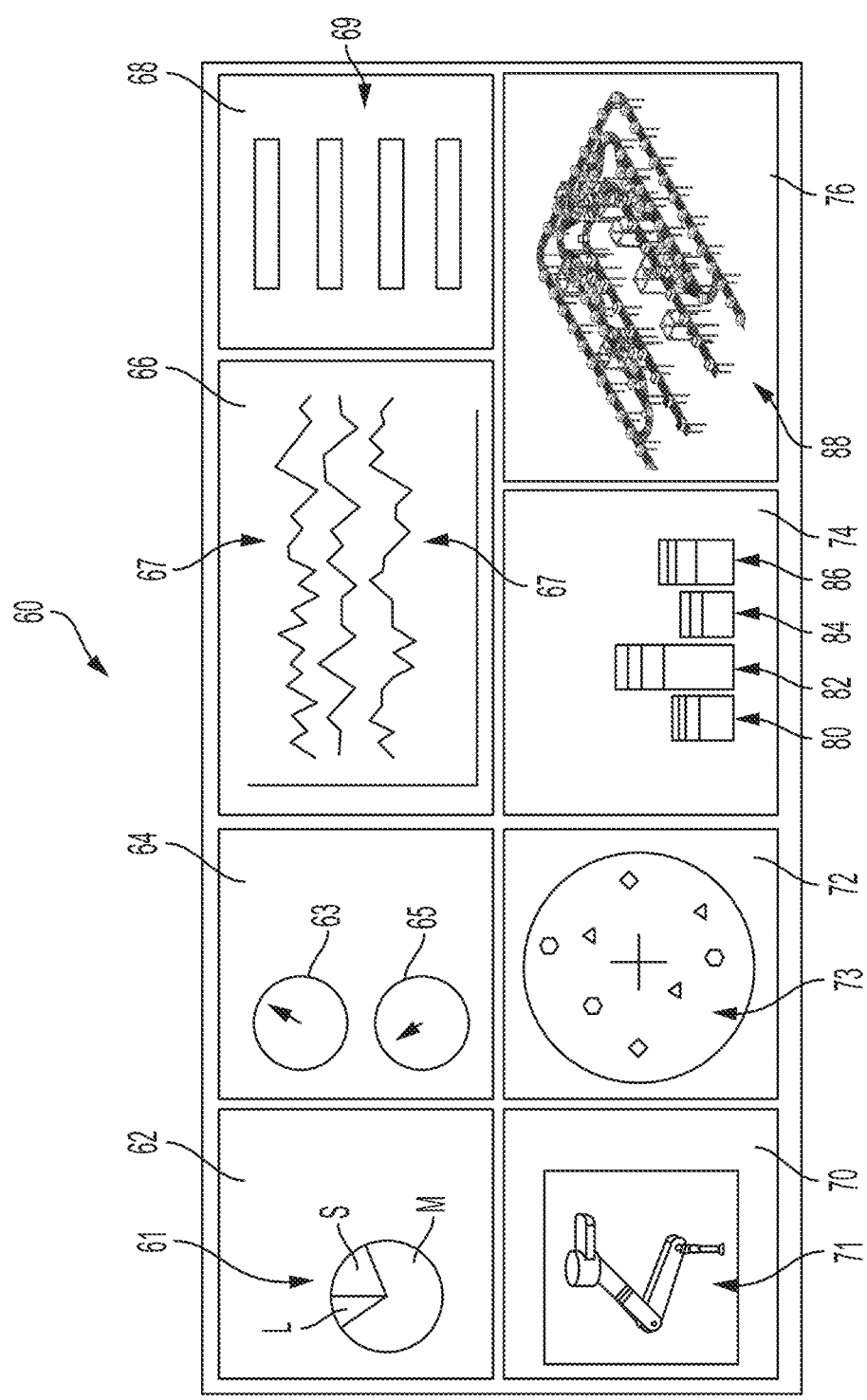
FIG. 4 shows a dashboard of metrics regarding a plurality of object processing systems for use in an analytics system in accordance with an aspect of the present invention.

The system may, for example, provide collective data, graphical data and video data regarding the processing of objects at a plurality of object processing stations, including providing data regarding individual processing stations as well as collected data regarding the processing of objects at a plurality of processing stations. For example, FIG. 4 shows at 60 a collective dashboard of a variety of current and collected metrics regarding the processing of multiple programmable motion devices at a plurality of facilities. As shown at the frame of 62 for example, the system may show the sizes of chosen vacuum cups (S—small, M—medium and L—large) averaged over time by any of single processing station, multiple processing stations at a facility or averaged over multiple processing stations. As shown at the dashboard frame of 64, the system may show current vacuum pressures at a plurality of programmable motion devices as shown at 63 and 65. The system may, for example, show real time values of the vacuum pressure at each of a plurality of programmable motion devices, and may permit an analyst to select a particular programmable motion device for viewing, or may automatically show each of the programmable motion devices in succession at a facility or at a plurality of facilities.

With reference to the dashboard frame at 66, the analytics system may show active data regarding shuttle picks per hour 67 at each of a plurality of programmable motion devices, or picks per hour at each of a plurality of facilities. The dashboard may also show, e.g., at frame 68, a plurality of sums of pick counts 69 at plurality of facilities, and may show, e.g., at frame 70, an active live video image of a programmable motion device. The system may, for example, show real time video data of a plurality of programmable motion devices, and may permit an analyst to select a particular programmable motion device for viewing, or may automatically show each of the programmable motion devices in succession at a facility or at a plurality of facilities.

The analytics system may also monitor the activity of each programmable motion device by assessing the accuracy of placement of the vacuum gripper on objects (for example using the cameras 11, 13, 15, 17). The monitoring may be collected over time and displayed as averaged over a time period such as each hour, which may even out any variations due to grasp programming that intentionally seeks non-central locations on objects for grasping. For example, if certain objects are chosen for grasping at specific non-central locations (not central to an exposed viewing surface), the averaging over time, even accounting for different orientations of objects presented to the processing system 12, should balance. A graphical display 73 as shown in the dashboard frame 72 may provide visual data regarding averages of grasps that are not central (represented as the central cross).

In accordance with further aspects, the dashboard may include a frame 74 that includes data regarding termination errors codes presented at each of a plurality of programmable motion devices, for example, showing termination error codes in bar graph format 80, 82, 84, 86 for each of four programmable motion devices. In accordance with a further aspect, each graph format 80, 82, 84, 86 may be compiled as an average of termination error codes over time for each of a plurality of multi-processing facilities. With reference to the dashboard frame 76, the system may provide real time visual images of entire facilities (or portions thereof), so that an analyst may view each of a plurality of facilities serially over time, again, either by selection, or on a rotating timed bases (e.g., changing the view every 15 seconds). In accordance with further aspects, the dashboard may include a wide variety of further real time and collected (e.g., averaged) data regarding shuttles (sections of processing system facilities), including the number of successful transfers (e.g., all shuttles), successful transfer per shuttle, average picks per tote, multi-pick outcomes (all shuttles), drops into pick (fast number and slow number), cumulative quantity transferred, per shuttle PPM, pick state grasp success counts, put-backs per shuttle, auto-swap counts, robot recoveries, transfer outcomes, non-item picks and non-item transfers.

In accordance with various aspects, analytical systems may further provide proactive alerting and anomaly detection, which involves the use of early real time analytical data. In an aspect, a system enables proactive alerting for undesired, or anomalous data emitted by the processing system. Examples of this include observed overall system performance degradation, non-standard gripper sensor data falling outside 'normal' expectations, and item (SKU) attribute or package changes not reported to the system via warehouse management system.

In accordance with further aspects, analytical systems may provide starvation or blockage inference, using systems that operate in close, often serial operation, with non-standard or unknown equipment. As a result, the solutions can be affected by starvation, which is the inability to get the necessary inputs to our system, e.g. totes with product. Additionally, this can also happen down-stream to the systems (described as a blockage), which is not allowing for the solutions/systems to generate the expected output in a non-blocked fashion. Both of these can have performance impacts not only on the processing system, but the facility as a whole. Through the analytics data being described here, metrics are provided for quantifying these starvation and blockage events. This can be used to inform customers of bottlenecks, issues, workflow shortcomings in their operation 2D & 3D image data. The recurring phrase 'wherein the object processing system data includes video data, including 2D & 3D image data.

Figure 5:
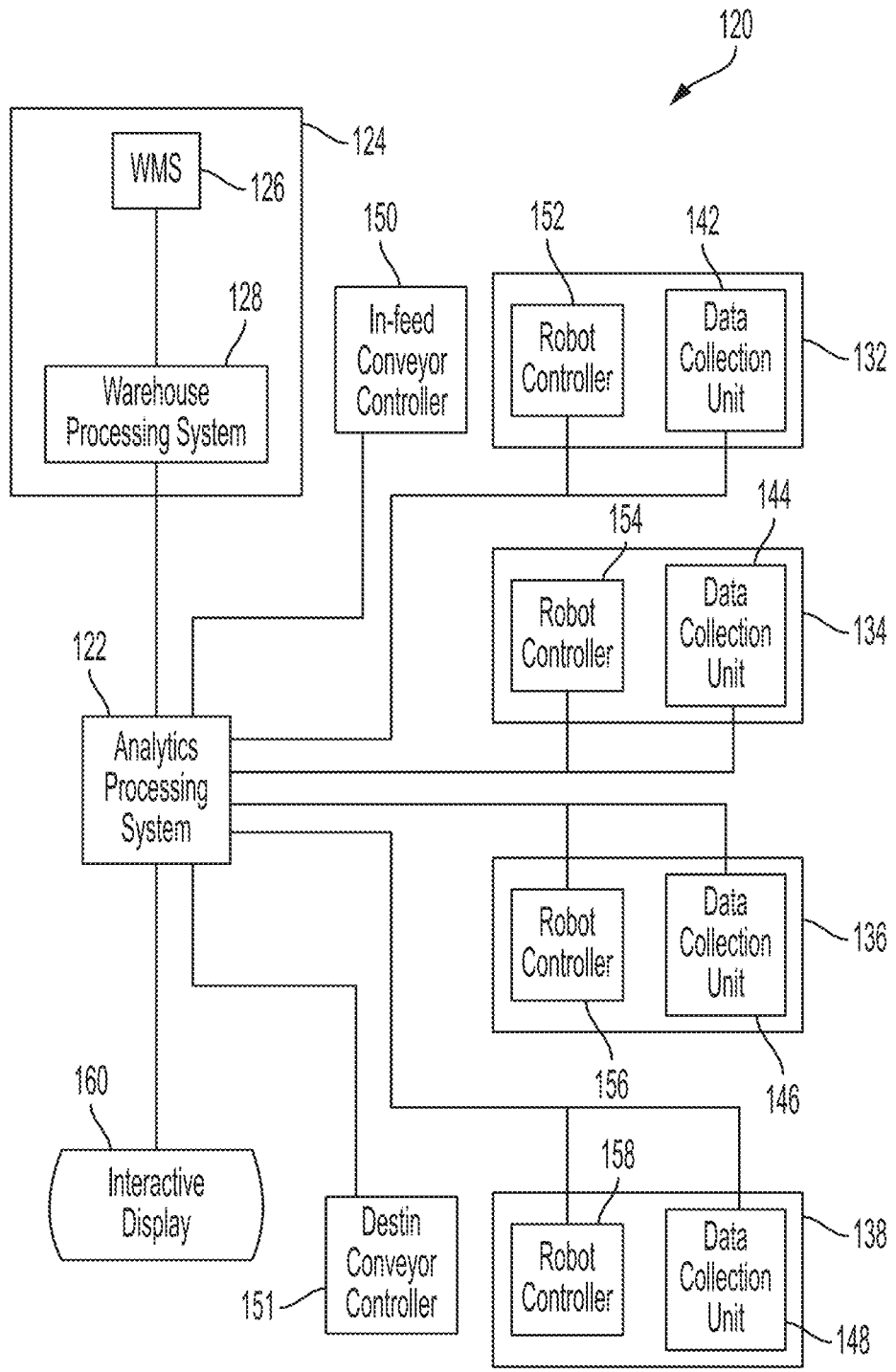
FIG. 5 shows a functional diagram of an analytics system in accordance with an aspect of the present invention.

With reference to FIG. 5, a system 120 in accordance with an aspect of the invention may include an analytics processing system 122 that is in communication with a warehouse management system (WMS) 126 and a warehouse processing system 128 at a warehouse facility 124. The analytics processing system 122 is also in communication with an in-feed conveyor controller 150 (that separately controls each of the in-feed conveyor speeds) as well as a destination conveyor controller 151 (that separately controls each of the destination conveyor speeds), as well as the a plurality of object processing systems 132, 134, 136, 138, each of which includes a data collection unit 142, 144, 146, 148 as well as a programmable motion device 152, 154, 156, 158. The data collection units provide collective and video data to the analytics processing system 122, which provides output dashboard interactive display information 160 to an analyst or supervisor.

Figure 6A:
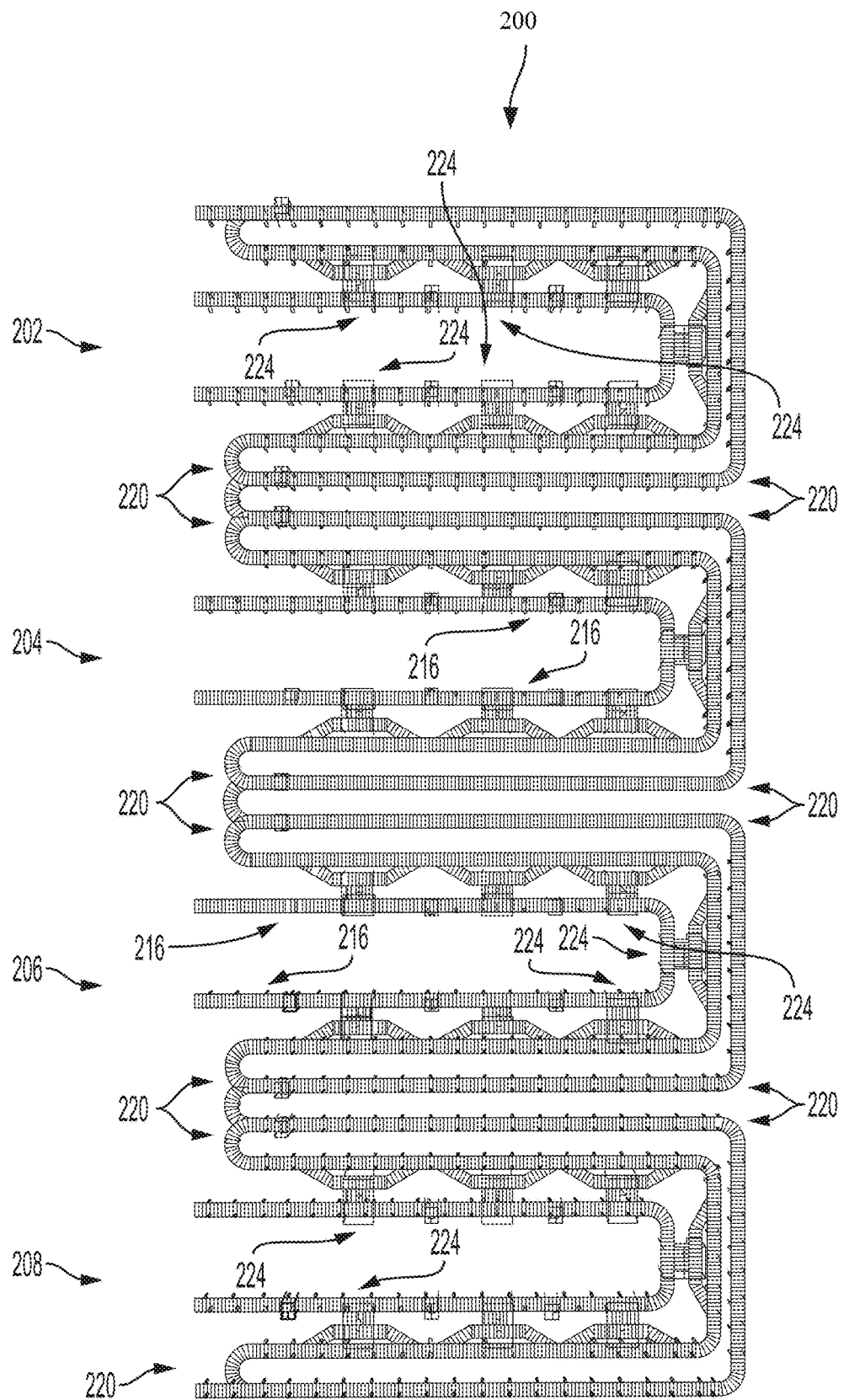
FIGS. 6A and 6B show illustrative diagrammatic views of complex processing systems in accordance with an aspect of the present invention, showing operation stations (FIG. 6A), and showing areas of concern among the operational stations (FIG. 6B)
Figure 6B:
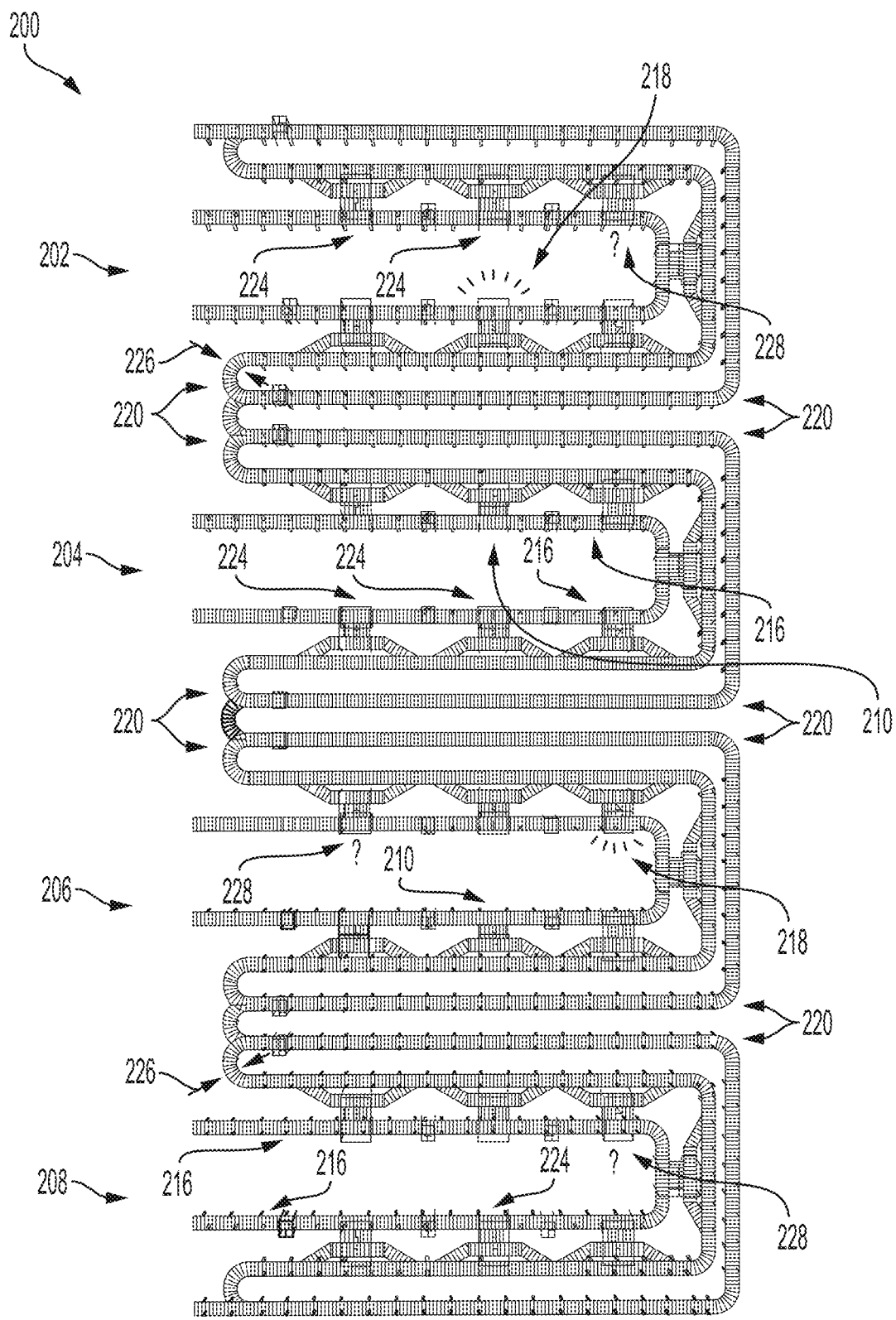

In particular, and with reference initially to FIG. 6A, a facility may include a complex processing system 200 that includes a plurality of processing shuttle sections 202, 204, 206, 208, each of which includes a plurality of programmable motion devices 224, as well as infeed conveyors 216 and output conveyors 220. With reference to FIG. 6B, the analytics system of certain aspects of the invention, may monitor the system 200 to provide information regarding relative starvation of bins or boxes (as shown at 218), blockage of bins or boxes (as shown at 226), elevated levels of compromised grips at a programmable motion device (as shown at 210), and elevated levels of not being able to recognize objects at a processing station (as shown at 228). The system may also monitor rates of changes of conveyor speeds, rates of changes of programmable motion device processing rates, and rates of changes of bin completions.

Figure 7A:
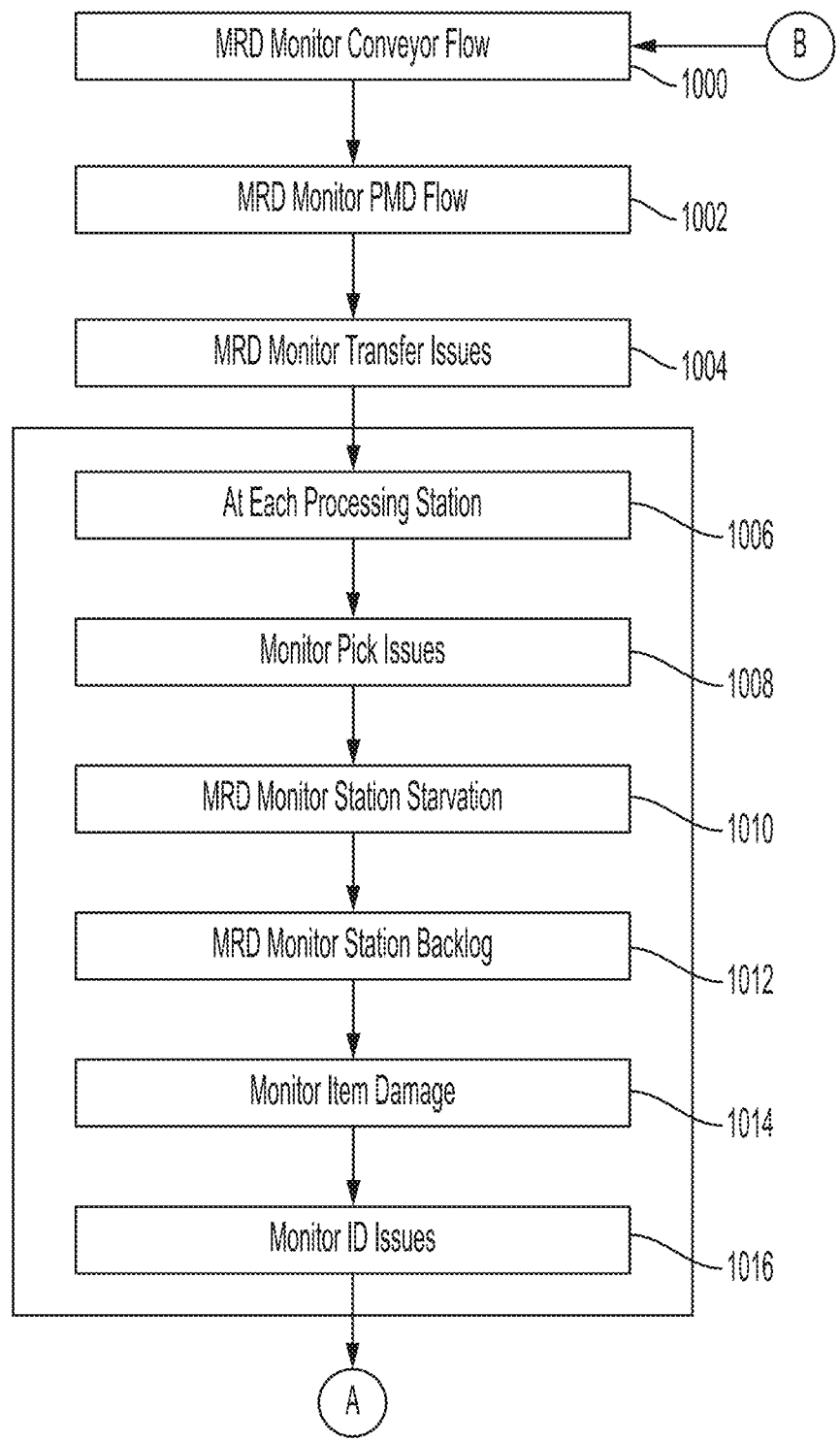
FIGS. 7A and 7B show an illustrative diagrammatic operational flow diagrams in connection with the analytics system in accordance with an aspect of the present invention.
Figure 7B:
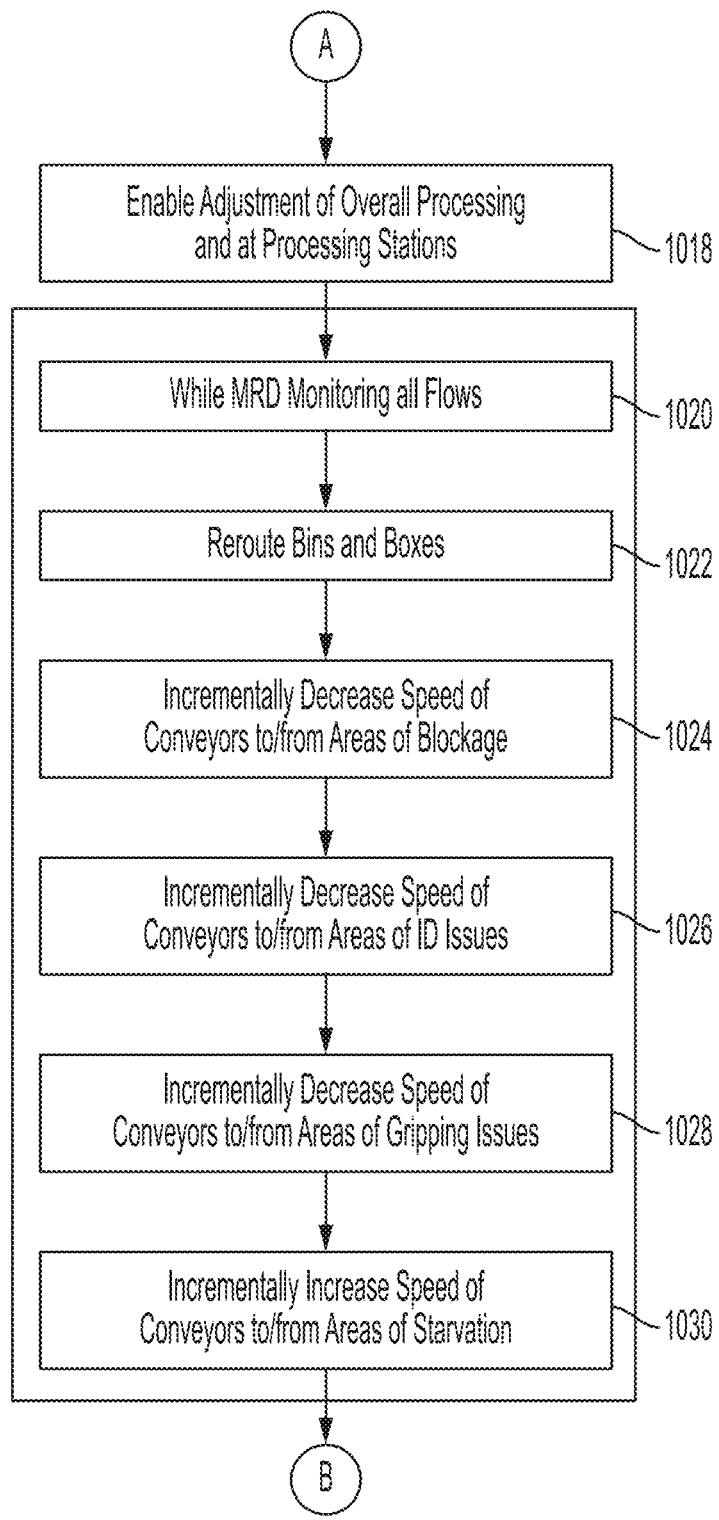

The process control in a system in accordance with an aspect of the invention may, with reference to FIGS. 7A and 7B, involve using the above discussed perception systems (on the conveyors, at the intake perception system and at the processing stations). In particular, the perception systems are used to monitor movement (e.g., conveyor flow as shown in step 1000) by using motion rate detection where motion detection is employed continuously over standard intervals of time, and a rate of change (motion rate) is continuously determined. Such a detection system may detect changes in motion much small than that which may be detected by human personnel, for example, changes of less than 5% of motion speed, and even less than 2% of motion speed. The perception systems may also monitor movement of the programmable motion devices (PMDs) using motion rate detection wherein the movement of the PMD is monitored for rates of speed changes (step 1002), again less than 5% or even less than 2%. The directions of movement of the PMDs is not as important as the rate of any changes in speed of movement of the PMDs as they move objects between bins and boxes at the processing stations. The system may even directly focus on movement of the PMDs as they are being used to transfer objects (step 1004) from one container (e.g., bin) to another container (e.g., shipping box) at all of the processing stations, recording instances of any transfer issues.

At each processing station (step 1006) the system may then monitor any issues with regard to picking (step 1008), and may use motion rate detection as discussed above to monitor an down-time (starvation) at each processing station step 1010), as well as any backlogs (step 1012) at each processing station. The system may also monitor an instances of items being damaged (step 1014) as well as any issued with regard to identifying items (step 1016).

With further reference to FIG. 7B, the system may then enable adjustment of all overall processing at the processing stations (step 1018). The system then conducts an iterative process of, while motion rate detection monitoring all flows (step 1020), reroute bins and boxes to steer them away areas of significant congestion/blockage (step 1022). More subtly however, the system makes small incremental changes to speeds of conveyors, both incrementally decreasing speeds of some conveyors for areas of blockages (step 1024), areas of identification issues (step 1026), areas of gripping issues (step 1028), and/or incrementally increasing speeds of other conveyors at areas of starvation (step 1030), all while monitoring by motion rate detection movement of all conveyors and PMDs. Such a system permits the conveyor speeds and the processing at processing stations to be adjusted at very minute levels during MRD monitoring to detect changes (positive and negative) in over all efficiency. Adjustments, for example, of conveyor speeds of less than 1% at different locations may have significantly beneficial results in efficiencies that could not be replicated by human personnel reacting to video monitors or other data.

Figure 8:
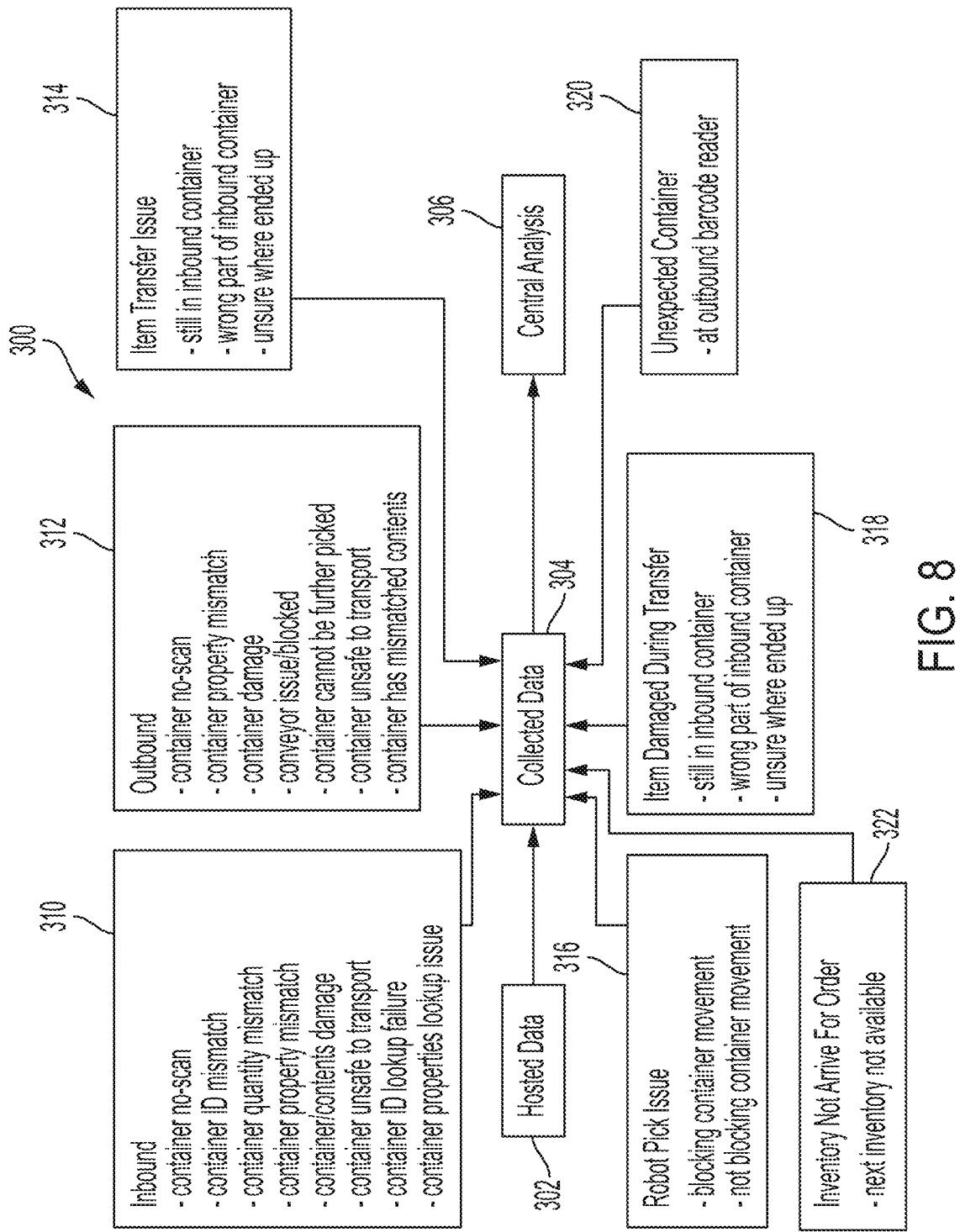
FIG. 8 shows a relational data collection diagram used in an analytics system in accordance with an aspect of the present invention.

With reference to the data collection diagram 300 of FIG. 8, the analytics system may therefore, receive at a collection data unit 304 inbound (310), outbound (312), item transfer issue (314), robot pick issue (316), item damaged during transfer (318), unexpected container (320) and inventory not arrive for order (322) data from the object processing systems, as well as hosed data 302 from the warehouse management system, and provide analytics output to a central analysis unit 306. The inbound data 310 may include data relating to container no-scan, container ID mismatch, container quantity mismatch, container property mismatch, container/contents damage, container unsafe to transport, container ID lookup failure, and container properties lookup issue. The outbound data 312 may include data relating to container no-scan, container property mismatch, container damage, conveyor issue/blocked, container cannot be further picked, container unsafe to transport and container has mismatched contents. The item transfer issue data may include data relating to still in inbound container, wrong part of inbound container, and insure where ended up. The robot pick issue data may include data relating to blocking container movement, and not blocking container movement. The item damages during transfer data may include data relating to still-in-inbound container, wrong-part of inbound container, and unsure where the item went. The unexpected container data may include data relating to unexpected container at outbound barcode reader, and the inventory not arrive for order data may include data relating to next inventory not available.

Figure 9:
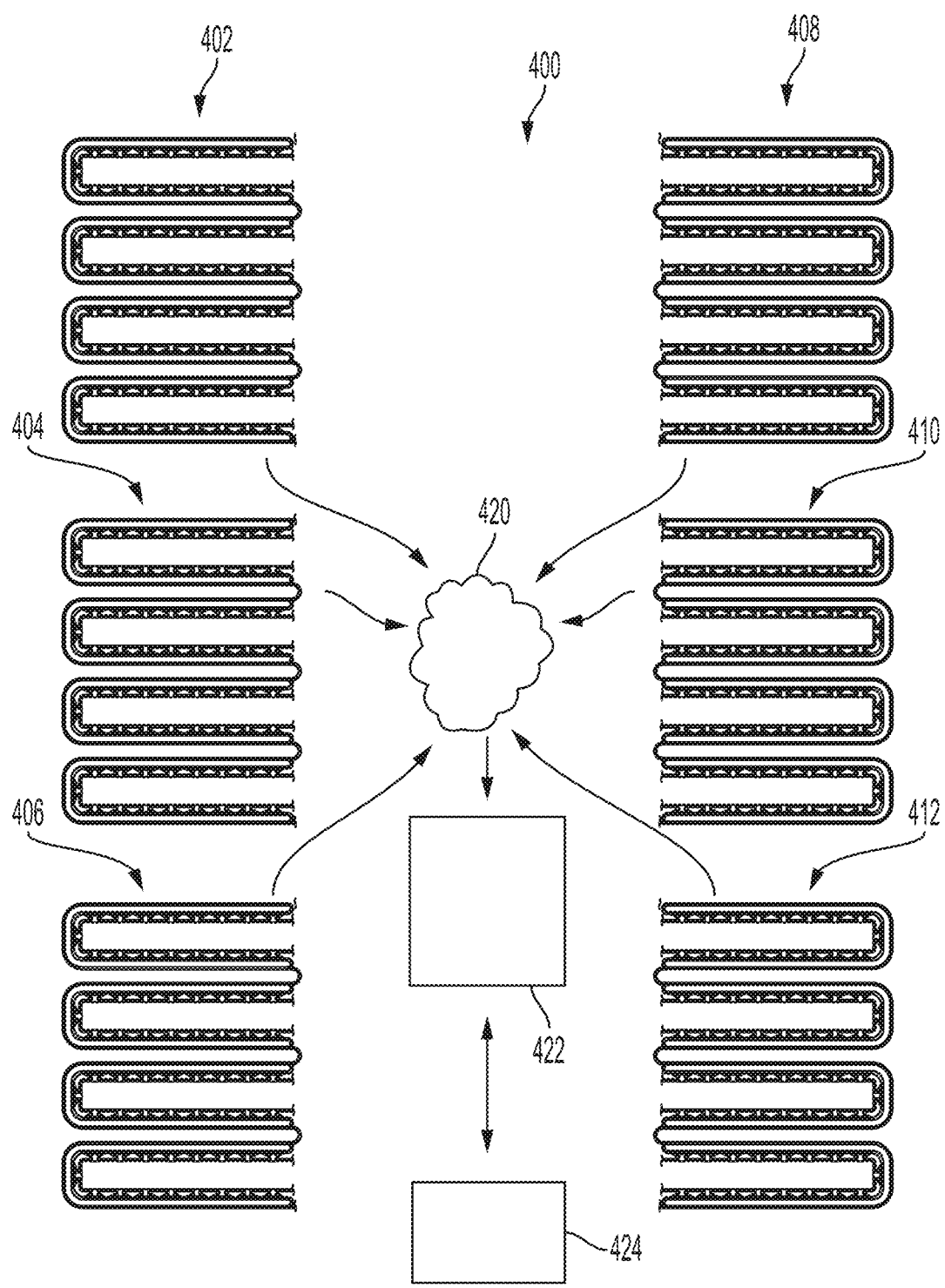
FIG. 9 shows an illustrative diagrammatic view of an analytics system with a plurality of object processing stations in accordance with an aspect of the present invention.

The analytics system may collect data from a plurality of facilities as shown at 400 in FIG. 9, where facilities 402, 404, 406, 408, 410 and 412 all provide hosted data to aggregation servers 420 in communication with hosted visualization analytics tools system 422. A central control system 424 may further communicate with the hosted visualization tools system 422.

Real-time analytics options therefore include: 1) facility hosting and central reporting, 2) central hosted and facility managed dashboards, and 3) facility hosted and central curated procedures. The facility hosting and central reporting system provides facility hosted analytics with central reporting, with the facility responsible for hosting and management, creating and managing views/dashboards, and user authentication. The central reporting role involves real-time reporting (piping) of metrics.

The central hosting and facility managed dashboards involves the facility being responsible for user authentication, with central reporting role to be responsible for hosting and management, creating and managing views/dashboards, and real-time reporting (piping) of metrics. The facility hosted and central curated system provides the central role being responsible for piping metrics and curating dashboards, and creating and managing views, with the facility being responsible for hosting and management, and user authentication. In each of these systems, the dashboard views may provide key metrics & subsystem performance, starvation and statistics for how to fully utilize the BG system (and warehouse as result), and blockages and starvation.

Non-Real-time Options for reporting include central reports at some frequency, providing central hosted and managed service for data collection enabling analysis (where the facility does not have access), and where the central role creates and provides reports at some frequency to send to the facility/customer. The creating and providing of reports may be manual to some degree, and/or may be automated, and the scope of the reports may vary.

In accordance with various aspects, the reporting may involve non-metric image/video data, including for example, queryable images of products handled by the central system (returns), and queryable video of products handled by central system (returns). The reporting may also involve real-time anomaly detection, such as SKU changes involving packaging changes: graphics changes, dimensional changes, weight changes, and ganging (attaching other products together). In accordance with further aspects, the systems may provide facility insights (possibly from the WMS system or central system), and product velocity and destinations. Further variants include metrics such as application metrics, infrastructure (CPU, memory) metrics, and maintenance metrics. Further variants may also include proactive alerting, such as central internal or direct to facility.

Various aspects of such systems may provide many benefits. The use of comprehensive data and image aggregation may provide information regarding the full range of potential questions about packages and logistics automation equipment. The use of facility or third party agnostic system provides facilitation of faster diagnosis and coordination in multi-facility or multi-vendor environments. The use of storage efficient system provides fast response time and long-term data retention supporting trend analysis. The use of such a scalable system provides a proven ability to handle volumes of very high volume logistical operations. The use of such an extensible system utilizes a robust core that facilitates the adding of new data sources and types. The use of readily customizable dashboards provides the streamlining of the process for generating new reports. The use of current IT standards permits connecting with enterprise security infrastructure, and conforming to IT security and network standards.

Facility compliance is provided, in part, by capturing label images and data, and sharing the information with each facility to ensure adherence to standards that allow automation equipment to function efficiently. Order fulfillment quality assurance is provided by capturing images of contents and packaged shipments to detect and resolve delivery issues speedily, and to uncover root causes of recurrent problems. Camera and laser tunnel health monitoring provide the capturing of data to better trigger maintenance and isolate root-causes of issues faster, which improves system uptime and facility relations. The providing of planning statistics provides workflow planner with accurate and current data on package size and label integrity. The use of ad hoc queries provides that data and images may be readily pulled for inquiries beyond those anticipated in default dashboards.

Those skilled in the art will appreciate that numerous modifications and variations may be made to the above disclosed aspects without departing from the spirit and scope of the present invention.

What is claimed is:

1. A system for providing real time analytical data regarding operational characteristics of a plurality of object processing systems that process objects in accordance with a warehouse management system, said system comprising:
    a data collection system for receiving real time data regarding processing at each of the plurality of object processing systems, each of the plurality of object processing systems including a programmable motion device that is programmed to process objects independent of other of the plurality of object processing systems;
    an analytics processing system that monitors the real time data from the data collection system and adjusts the processing of objects at one or more of the plurality of object processing systems responsive to the real time data; and
    a graphic display system for displaying the real time data from the analytics processing system regarding the processing of objects at one or more of the plurality of object processing systems;
    wherein the analytics processing system further provides that data relating to operations of the plurality of object processing systems are recorded, and at least one of:
    relative changes or anomalies in operation of a subject object processing system of the plurality of object processing systems are identified;
    the relative changes or anomalies relate to whether objects are successfully grasped by the subject object processing system; and
    the analytics processing system further includes a predictive alert system for providing proactive alerting of the relative changes or anomalies prior to a processing disruption event.

2. The system as claimed in claim 1, wherein the real time data includes data representative of an object being grasped by one of the plurality of object processing systems.

3. The system as claimed in claim 1, wherein the real time data includes data representative of an object being moved by one of the plurality of object processing systems.

4. The system as claimed in claim 1, wherein the real time data includes video data of one or more of the plurality of object processing systems processing an object.

5. The system as claimed in claim 1, wherein the real time data includes a number of picks of an object.

6. The system as claimed in claim 1, wherein the real time data includes any of video data, two dimensional and three dimensional data.

7. The system as claimed in claim 1, wherein the real time data includes a number of objects that the specific object processing system could not identify.

8. The system as claimed in claim 1, wherein the real time data includes a number of objects that the specific object processing system could not grasp.

9. The system as claimed in claim 1, wherein the graphic display system is interactive.

10. The system as claimed in claim 1, wherein the analytics processing system further provides that rates of movement of any of bins, totes or boxes are monitored to identify relative decreases in rates of movement of such bins, totes or boxes to identify any of blockages or starvations of a subject object processing system of the plurality of object processing systems.

11. The system as claimed in claim 1, wherein at least one of the plurality of data collection units includes a motion rate detection system for monitoring a speed of movement of the programmable motion device at one or more of the plurality of object processing systems.

12. An analytics system for providing real time analytical data regarding operational characteristics of a plurality of object processing systems connected by at least one conveyor that process objects in accordance with a warehouse management system, said analytics system comprising:
  a data collection system for receiving real time data regarding processing at each of the plurality of object processing systems, each of the plurality of object processing systems including a programmable motion device that is programmed to process objects independent of other of the plurality of processing systems;
  an aggregation system for aggregating and storing aggregated data over a period of time regarding processing at each of the plurality of object processing systems;
  an integration system for integrating the real time data with the aggregated data; and
  a conveyor control system for adjusting a speed of the at least one conveyor responsive to the aggregated data;
  wherein the analytics system further provides that data relating to operations of the plurality of object processing systems are recorded, and at least one of:
  relative changes or anomalies in operation of a subject object processing system of the plurality of object processing systems are identified;
  the relative changes or anomalies relate to whether objects are successfully grasped by the subject object processing system; and
  the analytics processing system further includes a predictive alert system for providing proactive alerting of the relative changes or anomalies prior to a processing disruption event.

13. The analytics system as claimed in claim 12, wherein the analytics system presents to the graphic display system object specific data regarding the processing of a specific object.

14. The analytics system as claimed in claim 13, wherein the object specific data includes data representative of the grasping of the specific object by one of the plurality of object processing systems.

15. The analytics system as claimed in claim 13, wherein the object specific data includes data representative of the moving of the specific object by one of the plurality of object processing systems.

16. The analytics system as claimed in claim 13, wherein the object specific data includes data representative of video information regarding the processing of the specific object at an object processing system of the plurality of object processing systems.

17. The analytics system as claimed in claim 12, wherein the analytics system presents to the graphic display system object processing system specific data regarding the operation of a specific object processing system.

18. The analytics system as claimed in claim 17, wherein the object processing system specific data includes a number of picks of an object.

19. The analytics system as claimed in claim 17, wherein the object processing system specific data includes any of video data, two dimensional and three dimensional data.

20. The analytics system as claimed in claim 17, wherein the object processing system specific data includes a number of objects that the specific object processing system could not identify.

21. The analytics system as claimed in claim 17, wherein the object processing system specific data includes a number of objects that the specific object processing system could not grasp.

22. The analytics system as claimed in claim 12, wherein the data collection system includes a motion rate detection system for monitoring a speed of the at least one conveyor.

23. A method of providing real time analytical data regarding operational characteristics of a plurality of object processing systems connected by at least one conveyor that process objects in accordance with a warehouse management system, said method comprising:
  receiving real time data regarding processing at each of the plurality of object processing systems, each of the plurality of object processing systems including a programmable motion device that is programmed to process objects independent of other of the plurality of processing systems;
  monitoring the real time data regarding the processing of objects at one or more of the plurality of object processing systems;
  recording data relating to operations of the plurality of object processing systems;
  identifying relative changes or anomalies in operation of a subject object processing system of the plurality of object processing systems; and
  controlling a speed of the at least one conveyor connecting the plurality of object processing systems responsive to the real time data:
  wherein at least one of:
  relative changes or anomalies relate to whether objects are identified at the subject object processing system;
  the relative changes or anomalies relate to whether objects are successfully grasped by the subject object processing system; and
  the method further includes proactive alerting of the relative changes or anomalies prior to a processing disruption event.

24. The method as claimed in claim 23, further comprising displaying the real time data regarding the processing of a specific object.

25. The method as claimed in claim 23, wherein the real time data includes data representative of an object being grasped by one of the plurality of object processing systems.

26. The method as claimed in claim 23, wherein the real time data includes data representative of an object being moved by one of the plurality of object processing systems.

27. The method as claimed in claim 23, wherein the real time data includes video data of one or more of the plurality of object processing systems processing an object.

28. The method as claimed in claim 23, wherein the real time data includes a number of picks of an object.

29. The method as claimed in claim 23, wherein the real time data includes any of video data, two dimensional and three dimensional data.

30. The method as claimed in claim 23, wherein the real time data includes a number of objects that the specific object processing system could not identify.

31. The method as claimed in claim 23, wherein the real time data includes a number of objects that the specific object processing system could not grasp.

32. The method as claimed in claim 23, wherein the real time data includes motion rate detection data regarding a speed of any of the at least one conveyor or at least one programmable motion device.

* * * * *